(12) United States Patent
Watanabe et al.

(10) Patent No.: US 7,045,225 B2
(45) Date of Patent: May 16, 2006

(54) PERPENDICULAR MAGNETIC RECORDING MEDIUM AND MANUFACTURING METHOD THEREOF

(75) Inventors: Sadayuki Watanabe, Nagano (JP); Yasushi Sakai, Nagano (JP)

(73) Assignee: Fuji Electric Device Technology Co., Ltd., (JP)

( * ) Notice: Subject to any disclaimer, the term of this patent is extended or adjusted under 35 U.S.C. 154(b) by 0 days.

(21) Appl. No.: 10/723,182

(22) Filed: Nov. 26, 2003

(65) Prior Publication Data

US 2004/0157034 A1 Aug. 12, 2004

(30) Foreign Application Priority Data

Nov. 26, 2002 (JP) ............................. 2002-342589

(51) Int. Cl.
*G11B 5/66* (2006.01)
*G11B 5/70* (2006.01)

(52) U.S. Cl. ........................ 428/828; 427/130

(58) Field of Classification Search ................ 428/828, 428/831, 694 TM, 694 TS, 611, 667, 668, 428/900; 427/130
See application file for complete search history.

(56) References Cited

U.S. PATENT DOCUMENTS 4,632,883 A * 12/1986 Howard et al. ............. 428/611

2002/0127433 A1 * 9/2002 Shimizu et al. ...... 428/694 TM
2004/0110034 A1 * 6/2004 Kawada .................. 428/694 R
2004/0247945 A1 * 12/2004 Chen et al. ............ 428/694 TS

FOREIGN PATENT DOCUMENTS

| JP | 6-180834 A | 6/1994 |
| JP | 10-214719 A | 8/1998 |
| JP | 2002-312925 A | 10/2002 |

OTHER PUBLICATIONS

Machine translation of JP 1001-312925, Oct. 2002.*

* cited by examiner

Primary Examiner—Holly Rickman
(74) Attorney, Agent, or Firm—Rossi, Kimms & McDowell, LLP

(57) ABSTRACT

A perpendicular magnetic recording suitable for mass production and having suppressed spike noise has at least a seed layer, an orientation controlling layer, an antiferromagnetic layer, a soft magnetic layer, a magnetic recording layer, a protective layer, and a liquid lubricant layer formed on a nonmagnetic substrate. The orientation controlling layer is composed of a material comprising at least Ni and Fe, and having at least one element selected from the group consisting of B, Nb, and Si. The seed layer is composed of Ta. Further, after depositing the antiferromagnetic layer and the soft magnetic layer, but before depositing the magnetic recording layer, the substrate is heated to a blocking temperature or higher, and thereafter cooled to the blocking temperature or below while applying a static magnetic field in a radial direction of the substrate.

14 Claims, 2 Drawing Sheets

PERPENDICULAR MAGNETIC RECORDING MEDIUM AND MANUFACTURING METHOD THEREOF

BACKGROUND

To increase the recording density of a magnetic recording medium, a perpendicular magnetic recording technique has been contemplated as an alternative to the conventional longitudinal magnetic recording technique. A perpendicular magnetic recording medium uses a magnetic recording layer made of a hard magnetic material, and a backing layer made of a soft magnetic material that has a role of concentrating the magnetic flux generated by a magnetic head used for magnetizing (recording) the magnetic recording layer.

A perpendicular magnetic recording medium, however, has spike noise caused by magnetic domain walls formed in the soft magnetic layer that constitutes the backing layer. To reduce noise in a perpendicular magnetic recording medium, the formation of magnetic domain walls in the soft magnetic backing layer needs to be suppressed. In this respect, Japanese Patent Application Laid-open No. 6-180834 (paragraph no. 0029, FIG. 1), for example, uses a ferromagnetic layer of a Co alloy or the like, which is formed above or below the soft magnetic backing layer, that is magnetized in a desired direction to fix the magnetization thereof to control the formation of magnetic domain walls in a soft magnetic backing layer; Japanese Patent Application Laid-open No.10-214719 (paragraph no. 0009, FIG. 2)), for instance, uses an antiferromagnetic thin film with the magnetization thereof pinned using an exchange coupling technique.

In the above technique, the formation of magnetic domain walls can be suppressed through exchange coupling with the soft magnetic backing layer using an antiferromagnetic layer as a magnetic domain controlling layer, only if a sufficient exchange coupling is obtained. To obtain sufficient exchange coupling, however, as disclosed in the latter reference identified above, the soft magnetic backing layer needs to be heat treated to bring out the properties of the soft magnetic backing layer after the film formation. This heat treatment must be carried out for a long time while applying a magnetic field in the radial direction. Hence, this technique is not suited for mass production.

Moreover, with the technique disclosed in the former reference identified above, where a backing layer is formed by layering a soft magnetic layer and an antiferromagnetic layer a plurality of times, the structure of the backing layer becomes complex. Again, this technique is not suited for mass production.

Accordingly, there still remains a need for a perpendicular magnetic recording medium that has reduced noise while suited for mass production. The present invention addresses this need.

SUMMARY OF THE INVENTION

The present invention relates to a perpendicular magnetic recording medium and a manufacturing method thereof, and more specifically to a technique for suppressing the formation of magnetic domain walls in a soft magnetic layer to reduce noise.

One aspect of the present invention is a perpendicular magnetic recording medium. The medium can comprise a nonmagnetic substrate and at least a seed layer, an orientation controlling layer, an antiferromagnetic layer, a soft magnetic layer, a magnetic recording layer, a protective layer, and a liquid lubricant layer formed on the nonmagnetic substrate. The seed layer is composed of Ta and the orientation controlling layer is composed of a material comprising at least Ni and Fe, and at least one element selected from the group consisting of B, Nb, and Si.

The seed layer is formed on the substrate, in contact therewith, and the orientation controlling layer is formed on the seed layer in contact therewith. An exchange bias field controlling layer composed of an alloy containing at least Fe and Co can be formed between the antiferromagnetic layer and the soft magnetic layer.

The antiferromagnetic layer can be composed of an Mn alloy, and the soft magnetic layer can be composed of an NiFe alloy, a sendust alloy, or an amorphous Co alloy.

The substrate can be disk-shaped, and the direction of magnetization of the soft magnetic layer can be in the radial direction of the substrate.

Another aspect of the present invention is a method of manufacturing the a disk-shaped perpendicular magnetic recording medium having a nonmagnetic and at least an antiferromagnetic layer, a soft magnetic layer, and a magnetic recording layer formed on the nonmagnetic substrate. The method can comprise the following steps of: after depositing the antiferromagnetic layer and the soft magnetic layer, but before depositing the magnetic recording layer, heating the substrate with the thus formed layers to a blocking temperature or higher; and cooling the substrate with the thus formed layer to the blocking temperature or below while exposed to a static magnetic field applied in a radial direction of the substrate.

DETAILED DESCRIPTION

In a perpendicular magnetic recording medium according to the present invention, an orientation controlling layer is provided immediately below an antiferromagnetic layer to improve the crystallinity and the orientation of the antiferromagnetic layer, strengthening the exchange bias field. The orientation controlling layer is composed of a material containing NiFe having at least one element selected from the group consisting of B, Nb, and Si. Moreover, a seed layer, which can be composed of Ta, can be included to further improve the crystallinity and the orientation of the orientation controlling layer. This structure suppresses interdiffusion between Ta, Ni, and Fe atoms at the interface with the seed layer, as compared with a conventional orientation controlling layer made of NiFe or NiFeCr. Furthermore, the present structure also suppresses an initial growth layer of the orientation controlling layer, i.e., a thin part of thickness 0 to 2 nm that has lattice defects and poor crystallinity. The crystallinity and the orientation of the antiferromagnetic layer thus can be improved as compared with a conventional orientation controlling layer. Furthermore, an exchange bias field controlling layer can be provided between the antiferromagnetic layer and the soft magnetic layer to strengthen the exchange bias field. The exchange bias field controlling layer can be composed of an alloy containing at least Fe and Co.

Figure 1:
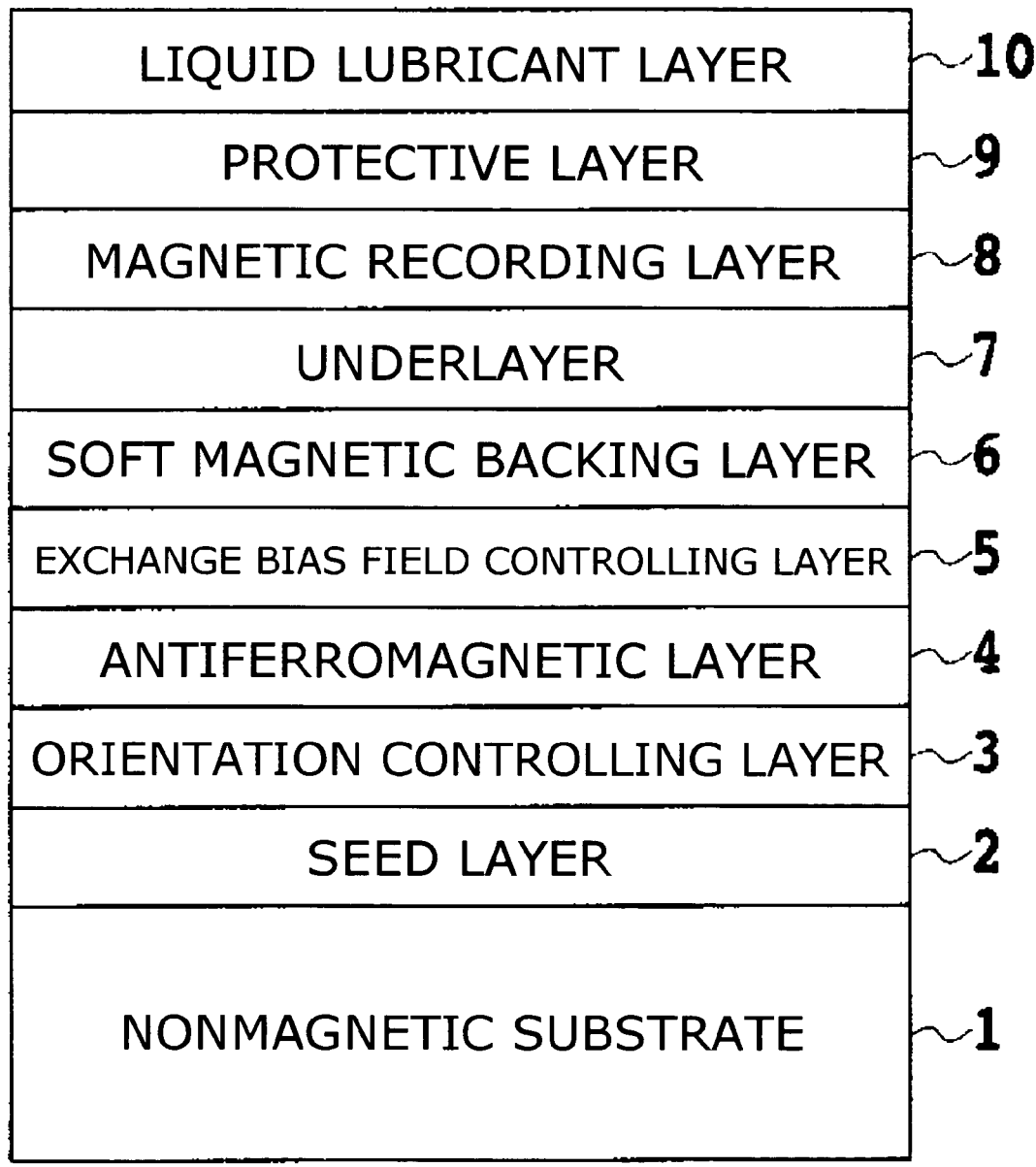
FIG. 1 schematically illustrates the structure of a perpendicular magnetic recording medium according to an embodiment of the present invention.

FIG. 1 schematically illustrates the structure of a perpendicular magnetic recording medium according to one embodiment of the present invention. This embodiment includes a nonmagnetic substrate 1 with a seed layer 2, an orientation controlling layer 3, an antiferromagnetic layer 4, an exchange bias field controlling layer 5, a soft magnetic backing layer 6, an underlayer 7, a magnetic recording layer 8, a protective layer 9, and a liquid lubricant layer 10 positioned in this order on the nonmagnetic substrate 1.

The nonmagnetic substrate 1 can be composed of a crystallized glass, a strengthened glass, or an Al alloy plated with NiP, as used in forming conventional magnetic recording media.

The seed layer 2 improves the crystallinity and the orientation of the orientation controlling layer 3. The preferred material for this layer is Ta. The thickness is preferably not more than 10 nm to keep the seed layer at the amorphous or microcrystalline structure.

The orientation controlling layer 3 improves the crystallinity and the orientation of the antiferromagnetic layer 4. The preferred material for this layer is a material containing at least Ni and Fe having at least one element selected from the group consisting of B, Nb, and Si. The thickness is preferably at least 3 nm so that sufficient crystal growth is observed.

The antiferromagnetic layer 4 can be composed of an Mn alloy, such as FeMn, CoMn, or IrMn. Although there are no particular limitations on the thickness of this layer, approximately 2 nm to 30 nm is preferred so that a suitable level of exchange coupling is obtained, while making it suitable for mass production.

The exchange bias field controlling layer 5 improves the exchange bias field. This layer can be composed of an alloy containing at least Fe and Co, such as FeCo, FeCoNi, FeCoB, or FeCoNiB. Considering productivity, the thickness is preferably kept not more than 20 nm.

Figure 2:
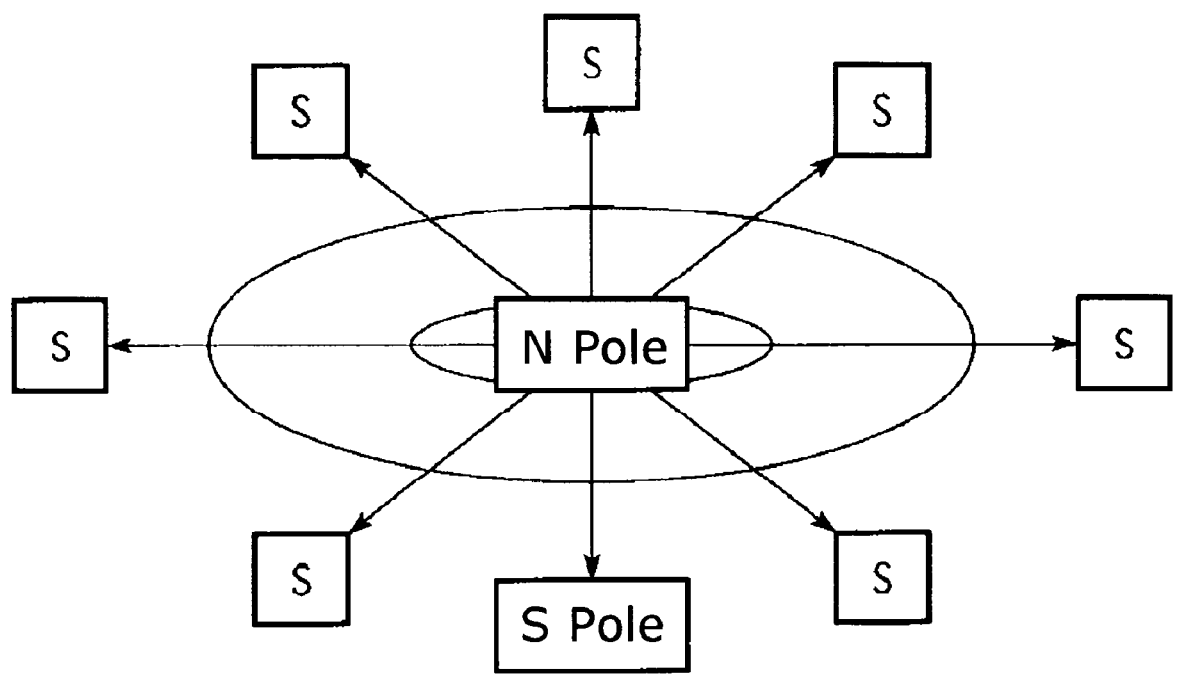
FIG. 2 schematically illustrates the application of a magnetic field in the radial direction of the substrate of a perpendicular magnetic recording medium.

The soft magnetic backing layer 6 can be composed of a crystalline system, such as an NiFe alloy or a sendust (FeSiAl) alloy, or an amorphous Co alloy, such as CoZrNb or CoTaZr. The optimum thickness will vary according to the structure and characteristics of the magnetic head used for recording, but considering also productivity, this thickness is preferably in a range of 10 nm to 500 nm. Assuming a commonly used disk-shaped medium, the magnetization of the soft magnetic backing layer 6 can be fixed by antiferromagnetic exchange coupling, preferably applied in the radial direction of the substrate as shown in FIG. 2.

The magnetic recording layer 8 can be composed of a commonly used CoCrPt material, or a granular magnetic recording layer in which the nonmagnetic grain boundaries that surround the ferromagnetic crystal grains comprise a nonmagnetic nonmetal, an RE-TM alloy such as TbCo, a multilayer film of Co/Pt or Co/Pd, an FePt ordered alloy, or the like. Note that to use the magnetic recording medium as a perpendicular magnetic recording medium, the ferromagnetic crystal grains must have perpendicular anisotropy relative to the film plane.

The underlayer 7 can be provided as appropriate depending on the material of the magnetic recording layer.

The protective layer 9 can be composed of mainly carbon, in a thin film form, for example. The liquid lubricant layer 10 can be composed of a perfluoropolyether lubricant for example.

During the manufacturing of the perpendicular magnetic recording medium, the substrate (with the thus formed layers) is heated to the blocking temperature or higher, namely the temperature at which the antiferromagnetic exchange coupling is lost, and then cooled down to the blocking temperature or lower while exposing to a controlled static magnetic field, for example, using permanent magnets. This technique allows the magnetization direction of the soft magnetic backing layer 6 to be in a unidirection.

When the substrate (with the thus formed layers) is heated after depositing the antiferromagnetic layer 4 and the soft magnetic backing layer 6, but before depositing the magnetic recording layer 8, if the heating temperature exceeds the blocking temperature, then the antiferromagnetic exchange coupling will disappear, losing the magnetization effect on the soft magnetic backing layer 6. If even a slight external magnetic field is applied in this state, then the magnetization of the soft magnetic backing layer 6 will be disordered, and raising the formation of magnetic domain walls. When the temperature drops to the blocking temperature or lower, and hence exchange coupling arises once again, the magnetization and the magnetic domain walls will then be fixed as is. This technique thus can be used while the magnetic recording medium is held in a static magnetic field during the cooling phase to the blocking temperature or lower.

According to the present technique, the soft magnetic backing layer 6 magnetization fixing effect can be obtained over the entire substrate. The strength of the static magnetic field is such that the magnetization of at least the exchange bias field controlling layer 5 and the soft magnetic backing layer 6 reaches saturation, preferably approximately 50 to 1000 Oe.

Following Examples 1–12 demonstrate the effectiveness of the present invention. Note that the present invention is not limited to the following examples, but rather various modifications can be made so long as the gist of the present invention is maintained.

In Example 1, the nonmagnetic substrate is a chemically strengthened glass substrate having smooth surfaces (for example, an N-10 glass substrate made by Hoya). This substrate was washed and then placed in a sputtering apparatus. A Ta seed layer was deposited to a thickness of 5 nm using a Ta target, and then an NiFeB orientation controlling layer was deposited to a thickness of 10 nm using an $Ni_{85}Fe_{12}B_3$ target. The substrate (with the thus formed layers) was heated using a lamp heater until the substrate surface temperature reached 350° C., and then an IrMn antiferromagnetic layer was deposited to a thickness of 10 nm using an $Ir_{20}Mn_{80}$ target, and then a CoZrNb amorphous soft magnetic backing layer was deposited to a thickness of 100 nm using a $Co_{87}Zr_5Nb_8$ target.

Next, a Ti underlayer was deposited to a thickness of 10 nm using a Ti target, and then a CoCrPt magnetic recording layer was deposited to a thickness of 20 nm using a $Co_{70}Cr_{20}Pt_{10}$ target. The substrate (with the thus formed layers) was heated again using a lamp heater until the substrate surface temperature reached 350° C., and then immediately cooled to 150° C. in a fixed magnetic field of 1000 Oe. Finally, a protective layer was deposited to a thickness of 10 nm using a carbon target, and then the magnetic recording medium was removed from the vacuum apparatus. The deposition of all of the layers was carried out by DC magnetron sputtering under an Ar gas pressure of 5 mTorr. Afterward, a 2 nm liquid lubricant layer made of a perfluoropolyether was formed using a dipping method, thus producing the perpendicular magnetic recording medium.

In Example 2, a perpendicular magnetic recording medium was produced as in Example 1, except that the orientation controlling layer was deposited to a thickness of 10 nm using an $Ni_{79}Fe_{12}Nb_9$ target.

In Example 3, a perpendicular magnetic recording medium was produced as in Example 1, except that the orientation controlling layer was deposited to a thickness of 10 nm using an $Ni_{84}Fe_{12}Si_4$ target.

In Example 4, a perpendicular magnetic recording medium was produced as in Example 1, except that after depositing the IrMn antiferromagnetic layer, but before depositing the CoZrNb soft magnetic backing layer, a CoFe exchange bias field controlling layer was deposited to a thickness of 2 nm using a $Co_{90}Fe_{10}$ target.

In Example 5, a perpendicular magnetic recording medium was produced as in Example 2, except that after depositing the IrMn antiferromagnetic layer, but before depositing the CoZrNb soft magnetic backing layer, a CoFe exchange bias field controlling layer was deposited to a thickness of 2 nm using a $Co_{90}Fe_{10}$ target.

In Example 6, a perpendicular magnetic recording medium was produced as in Example 3, except that after depositing the IrMn antiferromagnetic layer but before depositing the CoZrNb soft magnetic backing layer, a CoFe exchange bias field controlling layer was deposited to a thickness of 2 nm using a $Co_{90}Fe_{10}$ target.

In Example 7, a perpendicular magnetic recording medium was produced as in Example 4, except that the exchange bias field controlling layer was deposited using a $Co_{65}Ni_{13}Fe_{22}$ target.

In Example 8, a perpendicular magnetic recording medium was produced as in Example 5, except that the exchange bias field controlling layer was deposited using a $Co_{65}Ni_{13}Fe_{22}$ target.

In Example 9, a perpendicular magnetic recording medium was produced as in Example 6, except that the exchange bias field controlling layer was deposited using a $Co_{65}Ni_{13}Fe_{22}$ target.

In Example 10, a perpendicular magnetic recording medium was produced as in Example 4, except that the exchange bias field controlling layer was deposited using a $(Co_{65}Ni_{13}Fe_{22})_{94}B_6$ target.

In Example 11, a perpendicular magnetic recording medium was produced as in Example 5, except that the exchange bias field controlling layer was deposited using a $(Co_{65}Ni_{13}Fe_{22})_{94}B_6$ target.

In Example 12, a perpendicular magnetic recording medium was produced as in Example 6, except that the exchange bias field controlling layer was deposited using a $(Co_{65}Ni_{13}Fe_{22})_{94}B_6$ target.

For comparative purposes, Comparative Examples 1–3 were prepared. In Comparative Example 1, a perpendicular magnetic recording medium was produced as in Example 1, except that the Ta seed layer was omitted. In Comparative Example 2, a perpendicular magnetic recording medium was produced as in Example 1, except that the NiFeB orientation controlling layer was omitted. In Comparative Example 3, a perpendicular magnetic recording medium was produced as in Example 1, except that the Ta seed layer, the NiFeB orientation controlling layer, the IrMn antiferromagnetic layer and the CoZrNb soft magnetic backing layer were omitted.

For each of the Examples and Comparative Examples, to ascertain whether magnetic domain walls were formed in the soft magnetic backing layer, using a spin stand tester, an evaluation was carried out by carrying out reading in a state in which signals had not been written. Reading was carried out for 100 revolutions of the disk, and the ratio of the fluctuation to the mean value of the output was taken as the COV (%). Spike noise from magnetic domain walls is detected as a locally large signal output, and when the magnetic domain walls waver the size of this signal output fluctuates. Thus, the larger the COV value, the greater the spike noise.

Moreover, to investigate the size of the exchange bias field, samples were produced for which the steps of depositing the Ti underlayer and the CoCrPt magnetic recording layer were omitted from the perpendicular magnetic recording medium manufacturing process. For these samples for each of the examples and comparative examples, the magnetization curve was measured in the radial direction of the substrate using a vibrating sample magnetometer, and the exchange bias field was calculated from the M—H loop obtained. The results are shown in Table 1.

TABLE 1

| | SEED LAYER | ORIENTATION CONTROLLING LAYER | EXCHANGE BIAS FIELD CONTROLLING LAYER | EXCHANGE BIAS FIELD (OE) | COV (%) |
|---|---|---|---|---|---|
| EXAMPLE 1 | Ta | NiFeB | — | 18.1 | 6 |
| EXAMPLE 2 | Ta | NiFeNb | — | 17.5 | 7 |
| EXAMPLE 3 | Ta | NiFeSi | — | 17.1 | 7 |
| EXAMPLE 4 | Ta | NiFeB | CoFe | 27.6 | 5 |
| EXAMPLE 5 | Ta | NiFeNb | CoFe | 27.1 | 5 |
| EXAMPLE 6 | Ta | NiFeSi | CoFe | 26.5 | 5 |
| EXAMPLE 7 | Ta | NiFeB | CoFeNi | 29 | 5 |
| EXAMPLE 8 | Ta | NiFeNb | CoFeNi | 28.4 | 5 |
| EXAMPLE 9 | Ta | NiFeSi | CoFeNi | 28.6 | 5 |
| EXAMPLE 10 | Ta | NiFeB | CoFeNiB | 31.4 | 5 |
| EXAMPLE 11 | Ta | NiFeNb | CoFeNiB | 31.2 | 5 |
| EXAMPLE 12 | Ta | NiFeSi | CoFeNiB | 30.4 | 5 |
| COMPARATIVE EXAMPLE 1 | | NiFeB | — | 8.2 | 11 |
| COMPARATIVE EXAMPLE 2 | Ta | — | — | 0 | 23 |
| COMPARATIVE EXAMPLE 3 | — | — | — | — | 5 |

The relationship between the size of the exchange bias field and the layer structure will now be discussed. Example 1 and Comparative Example 2 (no NiFeB orientation controlling layer), reveal that exchange coupling does not occur, as evidenced by 0 exchange bias field, when the orientation controlling layer is omitted. These examples make it clear that the orientation controlling layer increases the exchange bias field.

Example 1 and Comparative Example 1 (no Ta seed layer) reveal that a Ta layer also increases the exchange bias field.

Example 2 (NiFeNb layer) and Example 3 (NiFeSi) reveal that a NiFeNb layer is comparable to the NiFeSi layer. Examples 4 to 6 (with a CoFe exchange bias field controlling layer), Examples 7 to 9 (with a CoNiFe exchange bias field controlling layer), and Examples 10 to 12 (with a CoNiFeB exchange bias field controlling layer) all reveal that the exchange bias field can be increased by adding an exchange bias field controlling layer, in comparison to Examples 1 to 3.

Next, the relationship between the size of the exchange bias field and the COV will be discussed. In Comparative Example 3 (no soft magnetic backing layer), where no spike noise occurs, the COV was 5%. On the other hand, in Examples 4 to 12 where the exchange bias field was at least 26.5 Oe, the COV was similarly 5%. Thus, it can be seen that spike noise can be suppressed. Moreover, from Examples 1 to 3 and Comparative Examples 1 and 2, it can be seen that higher the exchange bias field, lower the COV.

As described above, a perpendicular magnetic recording medium having the following structure improves the crystallinity and the crystal orientation of the antiferromagnetic layer to strengthen the exchange bias field to suppress spike noise: an orientation controlling layer made of a material comprising at least Ni and Fe and at least one element selected from the group consisting of B, Nb, and Si, and a seed layer made of Ta formed immediately below the orientation controlling layer.

Moreover, the perpendicular magnetic recording medium can include an exchange bias field controlling layer made of an alloy containing at least Fe and Co formed between the antiferromagnetic layer and the soft magnetic backing layer. This structure further increases the exchange bias field to further suppress spike noise.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP 2002-342589 in its entirety, including the drawings, claims, and the specification thereof, is incorporated herein by reference.

What is claimed is:

1. A perpendicular magnetic recording medium comprising:
   a nonmagnetic substrate; and
   at least a seed layer, an orientation controlling layer, an antiferromagnetic layer, a soft magnetic layer, a magnetic recording layer, a protective layer, and a liquid lubricant layer formed on the nonmagnetic substrate,
   wherein the antiferromagnetic layer is composed of an Mn alloy,
   wherein the seed layer is composed of Ta, and
   wherein the orientation controlling layer is composed of a material comprising at least NI and Fe, and at least one element selected from the group consisting of B, Nb, and Si.

2. The perpendicular magnetic recording medium according to claim 1, wherein the seed layer is formed on the substrate, in contact therewith, and the orientation controlling layer is formed on the seed layer in contact therewith.

3. The perpendicular magnetic recording medium according to claim 1, further including an exchange bias field controlling layer composed of an alloy containing at least Fe and Co, formed between the antiferromagnetic layer and the soft magnetic layer.

4. The perpendicular magnetic recording medium according to claim 1, wherein the soft magnetic layer is composed of an NiFe alloy, a sendust alloy, or an amorphous Co alloy.

5. The perpendicular magnetic recording medium according to claim 2, wherein the soft magnetic layer is composed of an NiFe alloy, a sendust alloy, or an amorphous Co alloy.

6. The perpendicular magnetic recording medium according to claim 3, wherein the soft magnetic layer is composed of an NiFe alloy, a sendust alloy, or an amorphous Co alloy.

7. The perpendicular magnetic recording medium according to claim 1, wherein the substrate is disk-shaped, and the direction of magnetization of the soft magnetic layer is the radial direction of the substrate.

8. The perpendicular magnetic recording medium according to claim 2, wherein the substrate is disk-shaped, and the direction of magnetization of the soft magnetic layer is the radial direction of the substrate.

9. The perpendicular magnetic recording medium according to claim 3, wherein the substrate is disk-shaped, and the direction of magnetization of the soft magnetic layer is the radial direction of the substrate.

10. The perpendicular magnetic recording medium according to claim 4, wherein the substrate is disk-shaped, and the direction of magnetization of the soft magnetic layer is the radial direction of the substrate.

11. The perpendicular magnetic recording medium according to claim 5, wherein the substrate is disk-shaped, and the direction of magnetization of the soft magnetic layer is the radial direction of the substrate.

12. The perpendicular magnetic recording medium according to claim 6, wherein the substrate is disk-shaped, and the direction of magnetization of the soft magnetic layer is the radial direction of the substrate.

13. A method of manufacturing a perpendicular magnetic recording medium, comprising the steps of:
   providing a nonmagnetic substrate;
   forming at least a seed layer, an orientation controlling layer, an antiferromagnetic layer, a soft magnetic layer, a magnetic recording layer, a protective layer, and a liquid lubricant layer on the nonmagnetic substrate,
   wherein the antiferromagnetic lever is composed of an Mn alloy,
   wherein the seed layer is composed of Ta, and
   wherein the orientation controlling layer is composed of a material comprising at least Ni and Fe, and at least one element selected from the group consisting of B, Nb, and Si.

14. The method according to claim 13, further comprising the steps of:
   after forming the antiferromagnetic layer and the soft magnetic layer, but before forming the magnetic recording layer, heating the substrate with the thus formed layers to a blocking temperature or higher; and
   cooling the substrate with the thus formed layer to the blocking temperature or below while applying a static magnetic field in a radial direction of the substrate.

* * * * *

UNITED STATES PATENT AND TRADEMARK OFFICE
CERTIFICATE OF CORRECTION

| | |
|---|---|
| PATENT NO. | : 7,045,225 B2 |
| APPLICATION NO. | : 10/723182 |
| DATED | : May 16, 2006 |
| INVENTOR(S) | : Sadayuki Watanabe et al. |

It is certified that error appears in the above-identified patent and that said Letters Patent is hereby corrected as shown below:

--In Column 7, Line 65, the phrase "at least Nl and Fe" should read as "at least Ni and Fe"--

Signed and Sealed this

Eighth Day of August, 2006

JON W. DUDAS
*Director of the United States Patent and Trademark Office*